United States Patent
Goel et al.

(10) Patent No.: US 11,754,326 B2
(45) Date of Patent: *Sep. 12, 2023

(54) SENSOR VALIDATION

(71) Applicant: Lennox Industries Inc., Richardson, TX (US)

(72) Inventors: Rakesh Goel, Irving, TX (US); Siddarth Rajan, Addison, TX (US); Edward Robinson, Irving, TX (US); Patric Ananda Balan Thobias, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,083

(22) Filed: Sep. 14, 2022

(65) Prior Publication Data

US 2023/0003429 A1    Jan. 5, 2023

Related U.S. Application Data

(63) Continuation of application No. 16/804,496, filed on Feb. 28, 2020, now Pat. No. 11,480,371.

(51) Int. Cl.
*F24F 11/38* (2018.01)
*F25B 49/02* (2006.01)
(Continued)

(52) U.S. Cl.
CPC ......... *F25B 49/005* (2013.01); *B60H 1/3222* (2013.01); *F04B 49/065* (2013.01);
(Continued)

(58) Field of Classification Search
CPC .... F25B 41/45; F25B 49/005; F25B 2400/06; F25B 2500/26; F25B 2600/01;
(Continued)

(56) References Cited

U.S. PATENT DOCUMENTS

| 5,630,325 A | 5/1997 | Bahel et al. |
| 6,367,269 B1 | 4/2002 | Hanson et al. |

FOREIGN PATENT DOCUMENTS

EP    3290675 A1    3/2018

OTHER PUBLICATIONS

European Patent Office, Partial European Search Report (R. 64 EPC), Application No. 21156272.3, dated Jun. 29, 2021, 15 pages.

*Primary Examiner* — Jonathan Bradford
(74) *Attorney, Agent, or Firm* — Baker Botts L.L.P.

(57) ABSTRACT

An HVAC system includes a compressor, condenser, and evaporator. A sensor measures a value associated with the refrigerant in the condenser or the evaporator, and a controller is communicatively coupled to the compressor and the sensor. The controller determines, based on an operational history the compressor, that pre-requisite criteria are satisfied for entering a sensor validation mode. After determining the pre-requisite criteria are satisfied, an initial sensor measurement value is determined. Following determining the initial sensor measurement value, the compressor is operated according to a sensor-validation mode. Following operating the compressor according to the sensor-validation mode for at least a minimum time, a current sensor measurement value is determined. The controller determines whether validation criteria are satisfied for the current sensor value. In response to determining that the validation criteria are satisfied, the controller determines that the sensor is validated.

14 Claims, 5 Drawing Sheets

(51) Int. Cl.
  *F25B 49/00* (2006.01)
  *B60H 1/32* (2006.01)
  *F04B 49/06* (2006.01)
  *G05B 13/04* (2006.01)
  *F25B 41/45* (2021.01)
(52) U.S. Cl.
  CPC ............ *F25B 41/45* (2021.01); *G05B 13/048* (2013.01); *F25B 2400/06* (2013.01); *F25B 2500/26* (2013.01); *F25B 2600/01* (2013.01); *F25B 2600/0253* (2013.01); *F25B 2600/111* (2013.01); *F25B 2600/112* (2013.01); *F25B 2700/2104* (2013.01); *F25B 2700/2116* (2013.01); *F25B 2700/2117* (2013.01); *F25B 2700/21162* (2013.01); *F25B 2700/21163* (2013.01)
(58) Field of Classification Search
  CPC ........ F25B 2600/0253; F25B 2600/111; F25B 2600/112; F25B 2700/2104; F25B 2700/2116; F25B 2700/21162; F25B 2700/21163; F25B 2700/2117; G05B 13/048
  See application file for complete search history.

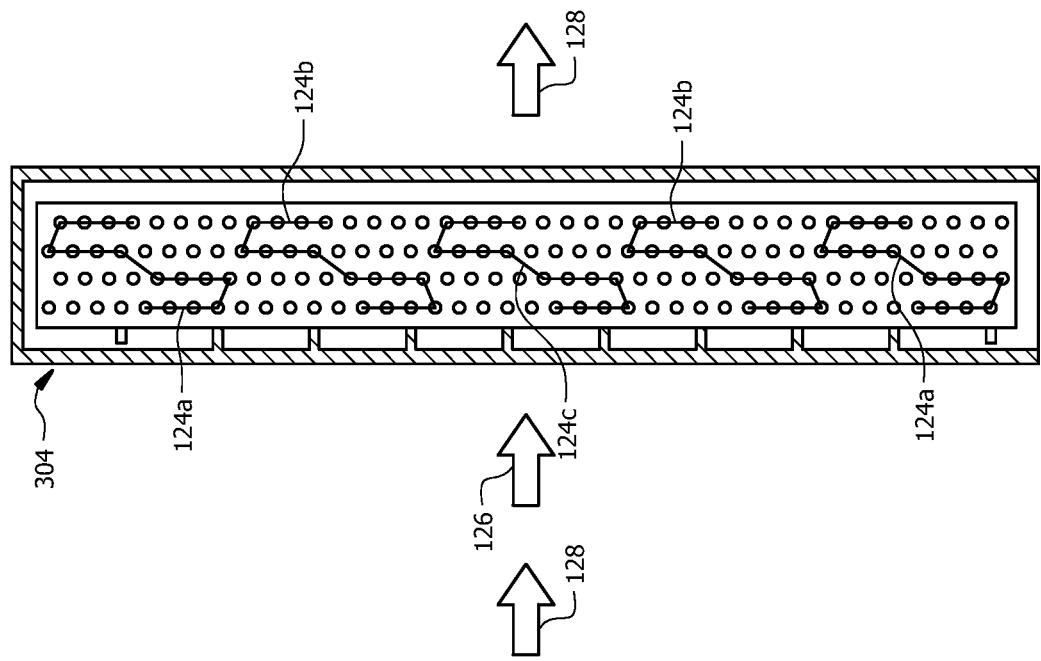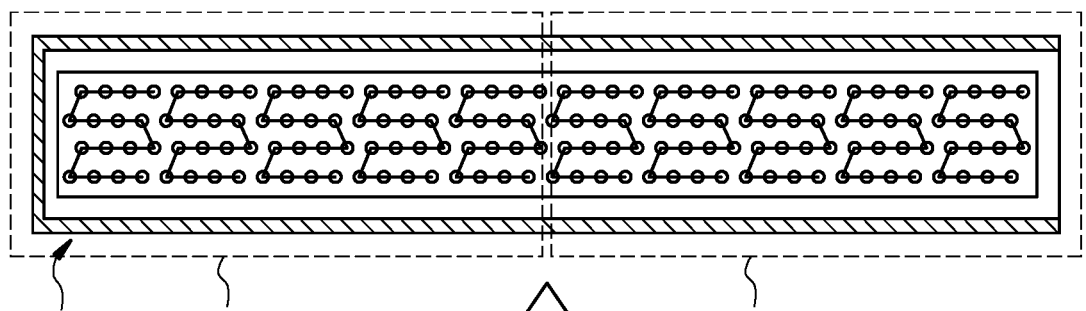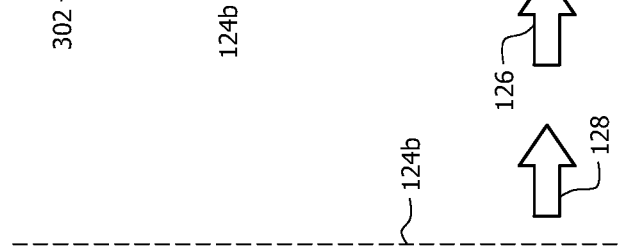

SENSOR VALIDATION

CROSS-REFERENCE TO RELATED APPLICATION

This application is a continuation of U.S. patent application Ser. No. 16/804,496, filed Feb. 28, 2020, by Rakesh Goel et al., entitled "SENSOR VALIDATION," which is incorporated herein by reference.

TECHNICAL FIELD

The present disclosure relates generally to heating, ventilation, and air conditioning (HVAC) systems and methods of their use. In certain embodiments, the present disclosure relates to sensor validation.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY OF THE DISCLOSURE

In an embodiment, an HVAC system includes a first compressor circuit with a compressor, condenser, and evaporator. A sensor is positioned and configured to measure a value associated with the refrigerant in the condenser or the evaporator, and a controller is communicatively coupled to the compressor and the sensor. The controller determines, based on an operational history the compressor, that pre-requisite criteria are satisfied for entering a sensor validation mode. The prerequisite criteria include a requirement that the compressor has been inactive for at least a minimum time. In response to determining the pre-requisite criteria are satisfied, an initial sensor measurement value is determined. Following determining the initial sensor measurement value, the compressor is operated according to a sensor-validation mode. Operating according to the sensor-validation mode involves operating the compressor at a maximum recommended capacity. Following operating the compressor according to the sensor-validation mode for at least a minimum time, a current sensor measurement value is determined. The controller determines whether validation criteria are satisfied for the current sensor value, based on a comparison of the current sensor measurement value to the initial sensor measurement value. In response to determining that the validation criteria are satisfied, the controller determines that the sensor is validated.

HVAC systems may include sensors for monitoring system performance and detecting system faults. For example, sensors may be positioned to measure a saturated suction temperature (or a corresponding saturated suction pressure) and a suction temperature of a refrigerant associated with an evaporator. This information may be used to determine a superheat value, the temperature difference between the temperature of the superheated vapor refrigerant and the saturation temperature of the refrigerant flowing through an evaporator of an HVAC system. As another example, sensors may be positioned to measure a saturated liquid temperature (or a corresponding saturated liquid pressure) and a liquid temperature of refrigerant associated with a compressor. This information may be used to determine a subcool value, or the temperature difference between the saturation temperature of the refrigerant and the temperature of the subcooled liquid refrigerant flowing through a condenser coil of an HVAC system. The superheat and/or subcool values may be used to detect a loss of charge in an HVAC system and/or diagnose other system faults. Sensors, such as those described above, may be relied upon to detect system faults and take appropriate corrective actions. However, there is generally a lack of tools for detecting problems associated with these sensors and reliably validating their operation and the reliability of their measurements.

The unconventional HVAC system and sensor validation approach described in this disclosure solves problems of previous technology by facilitating more efficient and reliable sensor validation than was possible using previous technology. The systems and sensor validation approach may be particularly effective for HVAC systems with complex configurations (e.g., with intertwined condenser coil configurations). This disclosure further encompasses the recognition that it may be difficult or impossible to validate sensor measurements in systems with multiple compressor circuits and/or in systems employing intertwined coils (e.g., in the condenser and/or evaporator). In some embodiments, multi-level validation checks are performed to further confirm sensor validation such that both false positive and false negative sensor failures are decreased. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 3A-C are diagrams of different coil configurations of the evaporator and/or condenser of the HVAC system of FIG. 1;

DETAILED DESCRIPTION

Figure 1:
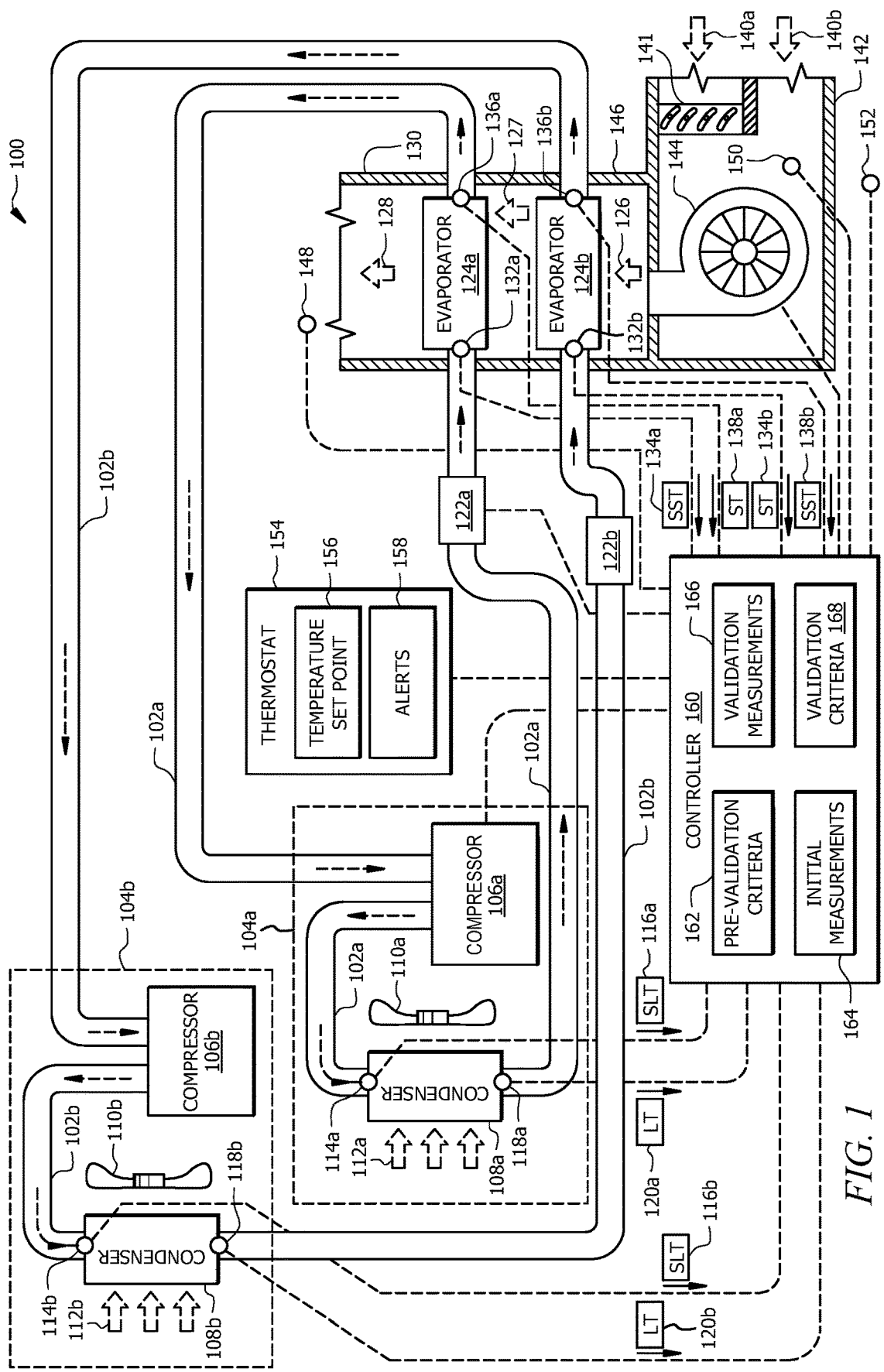
FIG. 1 is a diagram of an example HVAC system configured for sensor validation.

Embodiments of the present disclosure and its advantages are best understood by referring to FIGS. 1 through 5 of the drawings, like numerals being used for like and corresponding parts of the various drawings.

As used in the present disclosure, a "saturated liquid" refers to a fluid in the liquid state that is in thermodynamic equilibrium with the vapor state of the fluid for a given pressure. A "saturated liquid" is said to be at the saturation temperature for a given pressure. If the temperature of a saturated liquid is increased above the saturation temperature, the saturated liquid generally begins to vaporize. A "superheated vapor" refers to a fluid in the vapor state that is heated to a temperature that is greater than the saturation temperature of the fluid at a given pressure. A "subcooled liquid" refers to a fluid in the liquid state that is cooled below the saturation temperature of the fluid at a given pressure.

One metric of an HVAC system's operating conditions is the ratio of the cubic feet per meter (CFM) of conditioned air being supplied to a space to the tonnage of cooling performed by the system (i.e., or the "CFM/ton" measure of the system). The flow rate of air provided by a blower is generally measured in units of cubic feet per minute (CFM). The tonnage of the HVAC system corresponds to the cooling capacity of the system, where one "ton" of cooling corresponds to 12000 Btu/hr. The tonnage of the HVAC system is largely determined by the speed of the compressor(s) of the system, such that a decreased compressor speed corresponds to a decreased tonnage. The relationship between compressor speed and system tonnage may be approximately linear. Accordingly, the CFM/ton value of an HVAC system may be controlled by adjusting the flow rate of air provided by the blower and/or the speed of the compressor(s). For example, at a constant air flow rate from the blower, the speed of a variable-speed compressor may be decreased, to increase the CFM/ton value of the HVAC system.

As described above, prior to the present disclosure, there was a lack of tools for effectively and reliably validating sensors of an HVAC system. As such sensor errors may have gone unreported, resulting in poor efficiency and possible damage to the HVAC system or components thereof. This disclosure particularly encompasses the recognition that one or more particular criteria (i.e., pre-validation criteria) should be met before sensor validation is performed. For example, sensor validation may only be performed after the HVAC system has been de-energized for at least a minimum time. The use of these, and other such, pre-validation criteria ensures that the results of any test(s) used to validate one or more sensors are repeatable and reliable. In some cases, the pre-validation criteria may instead require that the compression circuit for which one or more sensors are being validated was inactive for at least a minimum time. Certain alternative or additional pre-validation criteria (e.g., a criteria that there is a cooling demand) improve system efficiency but limiting the number of validation tests, which generally involve cooling actions of the HVAC system, to times when cooling is actually needed. As demonstrated in various embodiments described herein, this disclosure further encompasses the unique recognition that a multi-tiered validation process may be especially effective at identifying actual sensor errors, thereby limiting false positive identification of errors and the resulting cost and down-time associated with subsequent maintenance or other intervention.

HVAC System

FIG. 1 is a schematic diagram of an embodiment of an HVAC system 100 configured to facilitate effective sensor validation. The HVAC system 100 conditions air for delivery to a conditioned space. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system may be located within the building and portion(s) outside the building. The HVAC system 100 may include one or more heating elements, not shown for convenience and clarity. The HVAC system 100 may be configured as shown in FIG. 1 or in any other suitable configuration. For example, the HVAC system 100 may include additional components or may omit one or more components shown in FIG. 1.

The example HVAC system 100 includes two compression circuits which can generally be operated independently. The first compression circuit includes a first working-fluid conduit subsystem 102a, at least one condensing unit 104a, an expansion valve 122a, and an evaporator 124a. The second compression circuit includes a second working-fluid conduit subsystem 102b, at least one condensing unit 104b, an expansion valve 122b, and an evaporator 124b. The HVAC system 100 also includes a thermostat 154 and a controller 160. The HVAC system 100 is generally configured to facilitate validation of sensors 114a,b, 118a,b, 132a,b, 136a,b as described in greater detail below. In brief, validation of one or more of the sensors 114a,b, 118a,b, 132a,b, 136a,b involves measuring an initial value with the sensor(s) 114a,b, 118a,b, 132a,b, 136a,b operating the compressor 106a,b associated with sensor(s) 114a,b, 118a,b, 132a,b, 136a,b being validated according to a sensor-validation mode (e.g., at 100% compressor 106a,b capacity) for a brief time (e.g., about 2-10 minutes), taking a second sensor measurement with the sensor(s) 114a,b, 118a,b, 132a,b, 136a,b being validated, and comparing the initial sensor measurement to the second sensor measurement to determine whether the sensor(s) 114a,b, 118a,b, 132a,b, 136a,b are operating correctly and can be validated for further use. If one or more of the sensors 114a,b, 118a,b, 132a,b, 136a,b are not validated an alert may be presented (e.g., as alert 158 on thermostat 154). In some cases, certain pre-requisite, or pre-validation criteria 162, must be satisfied before sensor validation is performed. Whether the pre-requisite criteria 162 are satisfied may be based on an operational history of the HVAC system 100 (e.g., how long one or more of the compressors 1'06a,b have or have not been active).

Each of the working fluid conduit subsystems 102a,b facilitates the movement of a working fluid (e.g., a refrigerant) through a cooling cycle such that the working fluid flows as illustrated by the dashed arrows in FIG. 1. The working fluid may be any acceptable working fluid including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

Each of the condensing units 104a,b includes at least one compressor 106a,b, a condenser 108a,b, and a fan 110a,b. In some embodiments, one or both of the condensing units 104a,b is an outdoor unit while other components of system 100 may be indoors. The compressor 106a,b is coupled to the corresponding working-fluid conduit subsystem 102a,b and compresses (i.e., increases the pressure of) the working fluid. The compressors 106a,b may be single-speed, variable-speed or multi-stage compressors. A variable-speed compressor is generally configured to operate at different speeds to increase the pressure of the working fluid to keep the working fluid moving along the working-fluid conduit subsystem 102a,b. In the variable-speed compressor configuration, the speed of compressor 106a,b can be modified to adjust the cooling capacity of the HVAC system 100. Meanwhile, in the multi-stage compressor configuration, one or more compressors can be turned on or off to adjust the cooling capacity of the HVAC system 100.

Each compressor 106a,b is in signal communication with the controller 160 using wired or wireless connection. The controller 160 provides commands or signals to control operation of the compressor 106a,b and/or receives signals from the compressor 106 corresponding to a status of the compressor 106a,b. For example, when a compressor 106a,b is a variable-speed compressor, the controller 160 may provide signals to control the compressor speed. When a compressor 106a,b operates as a multi-stage compressor, the signals may correspond to an indication of which compressors to turn on and off to adjust the compressor 106a,b for a given cooling capacity. The controller 160 may operate the compressor 106 in different modes corresponding to load conditions (e.g., the amount of cooling or heating required by the HVAC system 100). As described in greater detail below, the controller 160 may determine that one or both of the compressors 106a,b meets pre-validation criteria 162 before the compressor 106a,b is operated in a validation mode. The controller 160 is described in greater detail below with respect to FIG. 7.

Each condenser 108a,b is configured to facilitate movement of the working fluid through the corresponding working-fluid conduit subsystem 102a,b. Each condenser 108a,b is generally located downstream of the compressor 106a,b from the corresponding compression circuit and is configured to remove heat from the working fluid. Each fan 110a,b is configured to move air 112a,b across the condenser 108a,b from the corresponding compression circuit. For example, a fan 110a,b may be configured to blow outside air through the condenser 108a,b to help cool the working fluid flowing therethrough. The compressed, cooled working fluid flows from the condenser 108a,b toward an expansion device 122a,b of the corresponding compression circuit.

Each condenser 108a,b includes a corresponding first sensor 114ab and a second sensor 118a,b. In the example of FIG. 1, each first sensor 114a,b may be configured to measure a saturated liquid temperature of working fluid flowing in the condenser 108a,b and provide a corresponding saturated liquid temperature signal ("SLT") 116a,b to the controller 160. For example, a first sensor 114a,b may be a temperature sensor such as a thermocouple or a thermistor. In some embodiments, a first sensor 114a,b is a pressure sensor (e.g., to measure a saturation temperature indirectly via a measure of saturation pressure). Similarly, each second sensor 118a,b may be configured to measure a liquid temperature of working fluid flowing in the condenser 108a,b and provide a corresponding liquid temperature signal ("LT") 120a,b to the controller 160. For example, a second sensor 120a,b may be a temperature sensor such as a thermocouple or a thermistor.

Figure 2A:
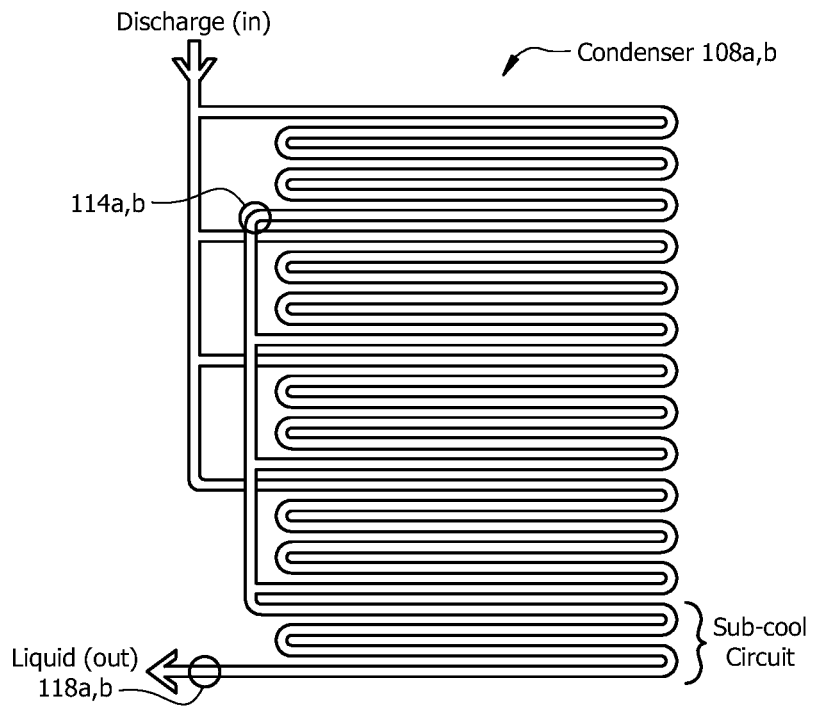
FIG. 2A is a diagram of an example condenser of the HVAC system of FIG. 1.

An example of a condenser 108a,b with sensors 114a,b and 118a,b is illustrated in FIG. 2A. As shown in this illustrative example, the first sensor 114a,b may be located approximately at the center of the length of a circuit of the condenser 108a,b. This location may correspond to a position where working fluid flowing through the condenser 108a,b is a saturated liquid. The second sensor 118a,b may be located on or near an exit of a subcool circuit of the condenser 108a,b or on a fluid line (i.e., on or in the working-fluid conduit subsystem 102a,b) just after the outlet of the condenser 108a,b. Sensors 114a,b and 118a,b may generally be attached on or within the condenser 108a,b and/or working-fluid conduit subsystem 102a,b using any appropriate means (e.g., clamps, adhesives, or the like).

Referring again to FIG. 1, each expansion device 122a,b is coupled to the corresponding working-fluid conduit subsystem 102a,b downstream of the condenser 108a,b and is configured to remove pressure from the working fluid. In this way, the working fluid is delivered to the evaporator 124a,b of the compression circuit and receives heat from airflow 126 to produce a conditioned airflow 128 that is delivered by a duct subsystem 130 to the conditioned space. In general, an expansion device 122a,b may be a valve such as an expansion valve or a flow control valve (e.g., a thermostatic expansion valve valve) or any other suitable valve for removing pressure from the working fluid while, optionally, providing control of the rate of flow of the working fluid. An expansion device 122a,b may be in communication with the controller 160 (e.g., via wired and/or wireless communication) to receive control signals for opening and/or closing associated valves and/or provide flow measurement signals corresponding to the rate of working fluid flow through the working fluid subsystem 102a,b.

Figure 2B:
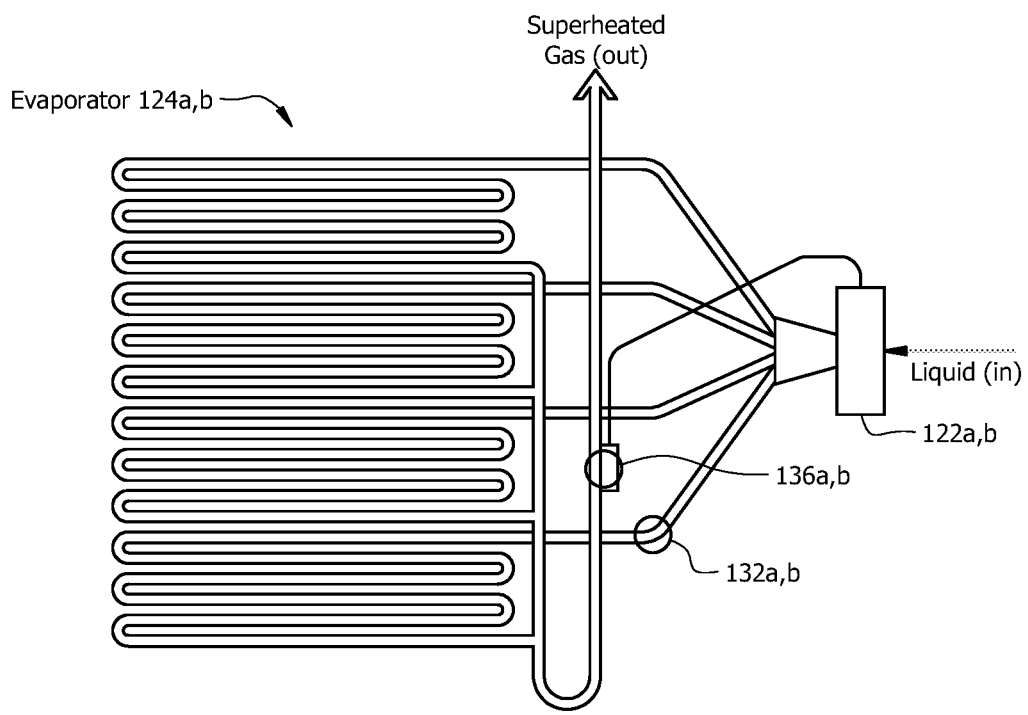
FIG. 2B is a diagram of an example evaporator of the HVAC system of FIG. 1

The evaporator 124a,b of each compression circuit is generally any heat exchanger configured to provide heat transfer between air flowing through the evaporator 124a,b (i.e., air contacting an outer surface of one or more coils of the evaporator 124a,b) and working fluid passing through the interior of the evaporator 124a,b. For example, the evaporator 124a,b may be or include one or more evaporator coils, as illustrated in FIG. 2B. In some embodiments, evaporators 124a,b are combined in a single coil unit, such as one of the coil units 300, 302, 304 illustrated in FIGS. 3A-C. Coil unit 300 of FIG. 3A is in a row-split configuration such that evaporator 124a is arranged next to evaporator 124b. Airflow 126 flows first through evaporator 124a before flowing through evaporator 124b and being output as conditioned airflow 128. Coil unit 302 of FIG. 3B is in a face-split configuration such that evaporator 124a is arranged above evaporator 124b. A portion of airflow 126 flows through evaporator 124a while a separate portion of airflow 126 flows through evaporator 124b. Coil unit 304 of FIG. 3C is in an intertwined configuration such that coils of evaporator 124a are intertwined with coils of evaporator 124b. Validation of sensors 132a,b and 136a,b may be performed differently depending on the configuration of evaporators 124a,b. For instance, when evaporators 124a,b are combined in an intertwined coil configuration as illustrated in the example of FIG. 3C, pre-validation criteria may indicate that both compressors 106a,b should be off for at least a minimum time before a validation mode is initiated. Conversely, only the compressor 106a,b for which sensor validation is being performed may need to have been de-activated for the minimum time when the face-split configuration of FIG. 3B is employed.

Referring again to FIG. 1, each evaporator 124a,b is fluidically connected to the compressor 106a,b of the corresponding compression circuit, such that working fluid generally flows from the evaporator 124a,b to the corresponding condensing unit 104a,b. A portion of the HVAC system 100 is configured to move air 126 across the evaporators 124a,b and out of the duct sub-system 130 as conditioned airflow 128. Return air 140a,b, which may include outdoor air 140a, indoor air 140b returning from the building, or some combination, is pulled into a return duct 142. A device 141 may be positioned on or in the duct 142 and include one or more dampers for modulating the amount of outside air 140a pulled into the return duct 142. When the HVAC system 100 is a rooftop unit (RTU), device 141 may be referred to as an economizer. Duct 142 may include additional dampers (not illustrated for clarity and conciseness), which may be configured, for example, to adjust the amount of indoor air 140b pulled into the duct 142.

Each evaporator 124a,b includes a corresponding third sensor 132a,b and a fourth sensor 136a,b. In the example of FIG. 1, each third sensor 132a,b may be configured to measure a saturated suction temperature of working fluid flowing in the evaporator 124a,b and provide a corresponding saturated suction temperature signal ("SST") 134a,b to the controller 160. For example, a third sensor 132a,b may be a temperature sensor such as a thermocouple or a thermistor. In some embodiments, a third sensor 132a,b is a pressure sensor (e.g., to measure a saturation temperature indirectly via a measure of saturation pressure). Similarly, each fourth sensor 136a,b may be configured to measure a suction temperature of working fluid flowing in the evaporator 124a,b and provide a corresponding suction temperature signal ("ST") 138a,b to the controller 160. For example, a fourth sensor 120a,b may be a temperature sensor such as a thermocouple or a thermistor.

An example of an evaporator 124a,b with sensors 132a,b and 136a,b is illustrated in FIG. 2B. As shown in this illustrative example, the third sensor 132a,b may be located approximately on or near an end of a distributor line (e.g., a line from the outlet of the expansion device 122a,b to the inlet of the evaporator 124a,b). This location may correspond to a position where working fluid flowing through, or into, the evaporator 124a,b is a saturated vapor. The fourth sensor 136a,b may be located on or near the outlet of the evaporator 124a,b. For instance, a fourth sensor 136a,b may be located in a portion of the evaporator 124a,b containing a super-heated vapor working fluid or on a portion of the working-fluid conduit subsystem 102a,b leading towards the suction side of the compressor 106a,b. Sensors 132a,b and 136a,b may generally be attached on or within the evaporator 124a,b and/or working-fluid conduit subsystem 102a,b using any appropriate means (e.g., clamps, adhesives, or the like).

A suction side of a blower 144 pulls the return air 140a,b. The blower 144 discharges airflow 126 into a duct 146 such that airflow 126 crosses the evaporators 124a,b or heating elements (not shown) to produce conditioned airflow 128. The blower 144 is any mechanism for providing a flow of air through the HVAC system 100. For example, the blower 144 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower. The blower 144 is in signal communication with the controller 160 using any suitable type of wired or wireless connection. The controller 160 is configured to provide commands and/or signals to the blower 144 to control its operation (e.g., to adjust the airflow to operate at a prescribed CFM/ton value during a validation mode).

The HVAC system 100 includes one or more sensors 148, 150, 152 in signal communication with the controller 160. The sensors 148, 150, 152 may include any suitable type of sensor for measuring air temperature, relative humidity, and/or any other properties of the conditioned space (e.g. a room or building), the HVAC system 100, and/or the surrounding environment (e.g., outdoors). The sensors 148, 150, 152 may be positioned anywhere within the conditioned space, the HVAC system 100, and/or the surrounding environment. For example, as shown in the illustrative example of FIG. 1, the HVAC system 100 may include a sensor 150 positioned and configured to measure a return air temperature (e.g., of airflow 150) and/or a sensor 148 positioned and configured to measure a supply or treated air temperature (e.g., of airflow 128), a temperature of the conditioned space, and/or a relative humidity of the conditioned space. The HVAC system includes a sensor 152 positioned and configured to measure an outdoor air temperature and/or other properties of the outdoor environment (e.g., relative humidity). In other examples, the HVAC system 100 may include sensors positioned and configured to measure any other suitable type of air temperature (e.g., the temperature of air at one or more locations within the conditioned space) or other property (e.g., a relative humidity of air at one or more locations within the conditioned space).

The HVAC system 100 includes a thermostat 154, for example, located within the conditioned space (e.g. a room or building). The thermostat 154 is generally in signal communication with the controller 160 using any suitable type of wired or wireless connection. The thermostat 154 may be a single-stage thermostat, a multi-stage thermostat, or any suitable type of thermostat. The thermostat 154 is configured to allow a user to input a desired temperature or temperature setpoint 156 of the conditioned space for a designated space or zone such as a room in the conditioned space. The controller 160 may use information from the thermostat 154 such as the temperature setpoint 156 for controlling the compressors 106a,b and/or the blower 144. In some embodiments, the thermostat 154 includes a user interface for displaying information related to the operation and/or status of the HVAC system 100, such as one or more alerts 158. For example, the user interface may display operational, diagnostic, and/or status messages and provide a visual interface that allows at least one of an installer, a user, a support entity, and a service provider to perform actions with respect to the HVAC system 100.

As described in greater detail below, the controller 160 is configured to perform any of the function described in this disclosure, as described both above and in greater detail below with respect to method 400 of FIG. 4. The processor, memory, and interface of the controller 160 is described in greater detail below with respect to FIG. 5.

As described above, in certain embodiments, connections between various components of the HVAC system 100 are wired. For example, conventional cable and contacts may be used to couple the controller 160 to the various components of the HVAC system 100, including, the compressors 106a, b, sensors 114a,b, 118a,b, 132a,b, 136a,b, the expansion valves 122a,b, the blower 144, sensor(s) 148, 150, 152, and thermostat(s) 154. In some embodiments, a wireless connection is employed to provide at least some of the connections between components of the HVAC system 100. In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 160 to other components of the HVAC system 100.

In an example operation of HVAC system 100, the HVAC system 100 starts up to provide cooling to an enclosed space based on temperature setpoint 156. For example, in response to the indoor temperature exceeding the temperature setpoint 156, the controller 160 may cause one or both of the compressors 106a,b and the blower 128 to turn on to startup the HVAC system 100. The HVAC system 100 is generally operated in a normal cooling mode (e.g., associated with a CFM/ton value in a range from about 400 to 450 CFM/ton). The controller 160 may intermittently check whether pre-requisite criteria 162 are satisfied for entering a sensor-validation mode, during which performance of one or more of the sensors 114a,b, 118a,b, 132a,b, 136a,b is evaluated. The pre-requisite criteria 162 generally correspond to requirements, based on the operational history of the HVAC system 100, which ensure sensor validation results will be trusted. For instance, the pre-requisite criteria 162 may include a requirement that a compressor 106a,b associated with a sensor 114a,b, 118a,b, 132a,b, 136a,b to be validated has been inactive for at least a minimum time (e.g., for at least 15 minutes). In this illustrative example, the controller 160 determines that sensors 114a, 118a, 132a, 136a associated with the first compressor circuit are due for validation (e.g., because sensors 114b, 118b, 132b, 136b associated with the second compressor circuit were more recently validated). In this example, sensor 132a is selected for validation.

If the pre-requisite criteria 162 are satisfied for validating sensor 132a, an initial sensor measurement value 163 may be determined using signal 134a. After recording the initial sensor measurement value 164, compressor 106a associated with (i.e., in the same compressor circuit as) sensor 132a is operated according to a sensor-validation mode. Operating according to the sensor-validation mode generally corresponds to operating the compressor 106a at a maximum recommended capacity (e.g., at 100% compressor speed). After the compressor 106a is operated according to the sensor-validation mode for at least a minimum time (e.g., for 2 minutes), a current sensor measurement value 166 is recorded based on the current value of signal 134a. The controller 160 then determines whether validation criteria 168 are satisfied based on a comparison of the current sensor measurement value 166 to the initial sensor measurement value 164. For instance, if the difference between the initial 164 and current 166 values (i.e., or the absolute value of the difference) is in a predefined acceptable range, the sensor 132a is considered validated, and its continued use is generally accepted. Otherwise, an alert 158 indicated that sensor 132a needs maintenance may be provided.

Example Validation Mode Operation

Figure 4:
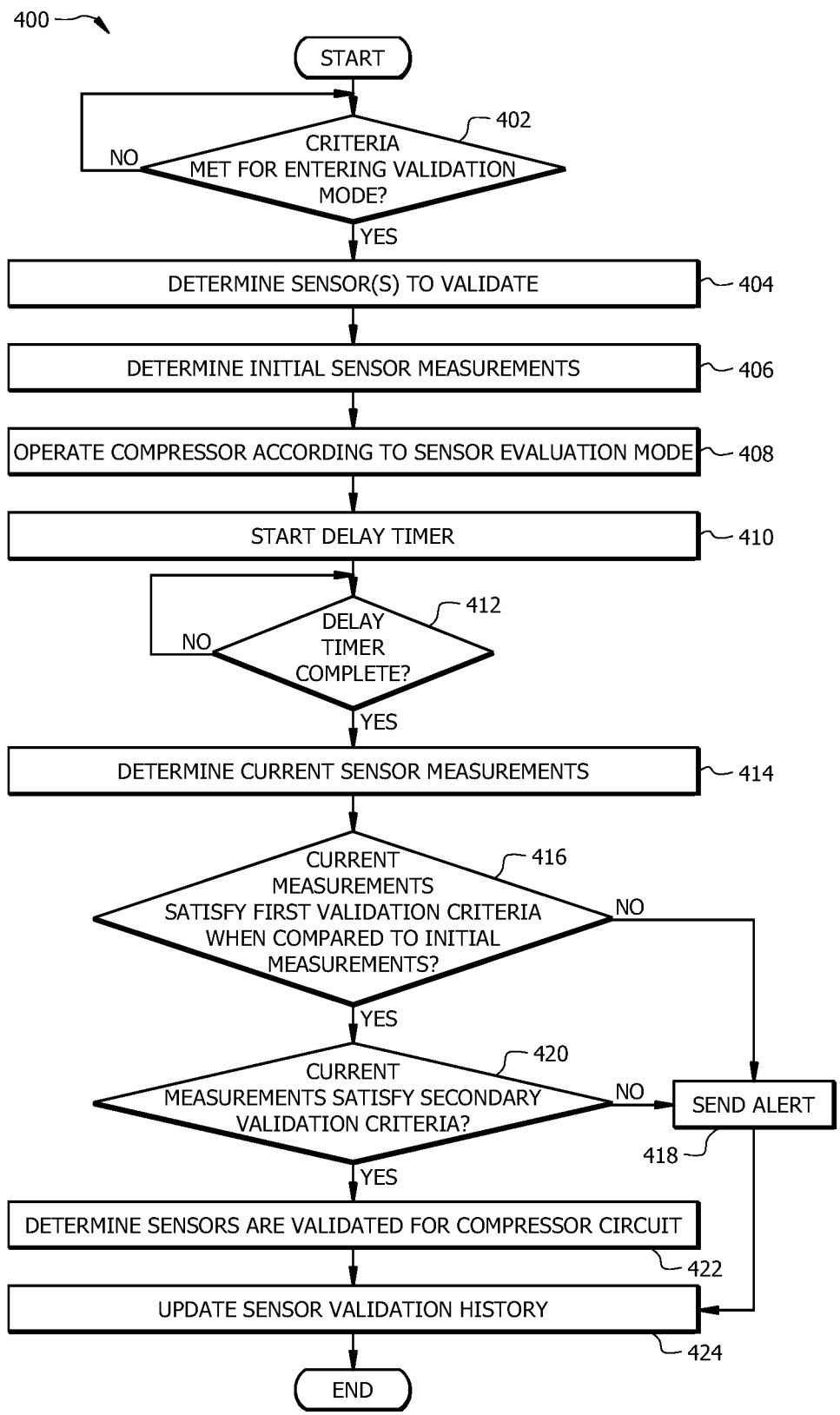
FIG. 4 is a flowchart illustrating an example method of validating one or more sensors of the HVAC system of FIG. 1.

FIG. 4 is a flowchart illustrating an example method 400 of operating the HVAC system 100 of FIG. 1. Method 400 may begin at step 402 where the controller 160 determines whether one or more of the pre-requisite criteria 162 are met for entering a sensor validation mode. The sensor validation criteria are generally related to the operational history of the HVAC system 100 and may include a requirement that the compressor 106a,b has been inactive for at least a minimum time. The minimum time may correspond to a minimum idle time of at least about 5 minutes to 30 minutes. In an embodiment, the minimum time is at least 15 min. For an HVAC system 100 that includes an evaporator 124a,b that is an intertwined evaporator coil (e.g., as illustrated in FIG. 3C), all compressors 106a,b must be inactive for the minimum time in order for the criteria to be met at step 402. This prevents any inconsistencies in sensor measurements caused by cooling between the coils in the intertwined evaporator configuration. Generally, for other evaporator coil types (e.g., for face-split configuration 302 of FIG. 3B) the pre-requisite criteria 162 may be that at least the compressor(s) 106a,b corresponding to the circuit of the sensor(s) 114a,b, 118a,b, 132a,b, 136a,b being validated is not active for the minimum time.

In some embodiments, additional or secondary pre-requisite criteria 162 are included to further improve the efficiency and/or reliability of the validation of method 400. For instance, a secondary pre-requisite criteria 162 may indicate that there is a cooling demand in the space being conditioned by the HVAC system 100. This may prevent a waste of energy when the system 100 is operated according to the sensor-validation mode (i.e., when one or more of the compressors 106a,b are operated at high capacity). In this way, in cooling achieved during the validation is not wasted. This results in improved overall operating efficiency of the HVAC system 100. Another example of a secondary pre-requisite criteria 162 is a requirement that the current time is an off-peak time (e.g., a time when people are not expected to be in the space being conditioned by the HVAC system 100) such that comfort is not sacrificed during sensor validation. For example, sensor validation may only be conducted between midnight and 4 am. Yet further examples of secondary pre-requisite criteria 162 are requirements that the outdoor air temp (e.g., measured with sensor 152 of FIG. 1) is greater than 55° F. and/or that both an outdoor air temperature sensor 152 and a return air temperature sensor 150 are operating properly (e.g., providing measurements within expected temperature ranges).

In some cases, the pre-requisite criteria 162 may take into account whether previous validations have already been attempted and failed for a given sensor 114a,b, 118a,b, 132a,b, 136a,b or corresponding compressor circuit. For instance, a criteria 162 may indicate that a sensor-validation mode can only be entered as long as there are less than a threshold number of previous failed validation attempts (e.g., less than two failed validations) since the previous passed validation for the sensor(s) 114a,b, 118a,b, 132a,b, 136a,b. In some cases, a further criteria 162 may include a requirement that the HVAC system 100 has no dehumidification demand before entering a sensor-validation mode. If the criteria 162 are not met at step 402, the controller 160 generally waits some time interval before repeating step 402 to check whether conditions have changed and the criteria 162 are satisfied at step 402. If the pre-requisite criteria are satisfied at step 402, the controller 160 proceeds to step 404.

At step 404, the controller 160 determines which sensor(s) 114a,b, 118a,b, 132a,b, 136a,b should be validated. For instance, the controller 160 may determine which compressor circuit is due for sensor validation (e.g., which sensors 114a,b, 118a,b, 132a,b, 136a,b have gone the longest time since their last validation). For instance, the controller 160 may determine that one or more of sensors 114a, 118a, 132a, 136a for the first compressor circuit should be validated or that one or more of sensors 114b, 118b, 132b, 136b of the second compressor circuit should be validated.

Once one or more sensors 114a,b, 118a,b, 132a,b, 136a,b are identified for validation, one or more initial sensor measurements are determined at step 406. For example, temperature, pressure, humidity, and/or the like measurements generated by one or more of the sensors 114a,b, 118a,b, 132a,b, 136a,b may be received by the controller 160. For example, the initial sensor measurements 164 may correspond to one or more of the signals 116a,b, 120a,b, 134a,b, 138a,b being received from the corresponding sensors 114a,b, 118a,b, 132a,b, 136a,b. These initial sensor measurements 164 may be stored in memory (e.g., memory 504 of controller 160 described below with respect to FIG. 5).

At step 408, the compressor(s) associated with the sensor(s) 114a,b, 118a,b, 132a,b, 136a,b being validated (i.e., the sensor(s) determined at step 404) are operated according to a sensor-validation mode. The sensor-validation mode generally corresponds to operation under high cooling conditions, such that a predefined amount of cooling is achieved and such that subsequently recorded sensor measurements can be compared to expected measurement values. In some cases, only one compressor 106a,b is operating during the sensor-validation mode (i.e., only the compressor associated with the compression circuit of the sensor(s) 114a,b, 118a,b, 132a,b, 136a,b being validated). The sensor-validation mode may correspond to operation at 100% compressor speed (i.e., at a maximum recommended compressor speed).

In some embodiments, the controller 160 may adjust the CFM/ton setting of the HVAC system 100 to provide greater cooling for the validation. Accordingly, the controller 160 may over-ride a default CFM/ton setting of the HVAC system 100 (e.g., a default value near 400 CFM/ton, e.g., from about 400 to 450 CFM/ton) to achieve the high cooling conditions for the sensor-validation mode. The adjusted CFM/ton setting may correspond to operation at a CFM/ton that is less than or equal to about 200 CFM/ton. Such a decreased CFM/ton may be achieved by operating at 100% compressor speed and a decreased speed of the blower 144 of FIG. 1. Such a decreased CFM/ton may facilitate a more rapid and/or a larger magnitude change in the saturated suction temperature and suction temperature measurements (e.g., based on signals 134a,b and 138a,b) during operation in the sensor-validation mode, thereby further improving reliability of the results of the sensor validation. In some embodiments, operation in the sensor-validation mode at step 408 may also or alternatively involve decreasing the speed of the outdoor fan 110a,b associated with the compression circuit of the sensor(s) 114a,b, 118a,b, 132a,b, 136a,b being validated. Decreasing the speed of fan 110a,b decreases the rate of air flow 112a,b across the condenser 108a,b. Such a decreased rate of air flow 112a,b may facilitate a more rapid and/or a larger magnitude change in the saturated liquid temperature and liquid temperature measurements (e.g., based on signals 116a,b and 120a,b) during operation in the sensor-validation mode, thereby further improving reliability of the results of the sensor validation.

In some embodiments, operation in the sensor-validation mode at step 408 may also or alternatively involve closing dampers of the economizer 141 (i.e., to prevent outdoor air flow 140a from entering duct 142). With the economizer in the closed position, outdoor air flow 140a is not provided across the evaporator 124a,b. This may facilitate more reliable changes in the saturated suction temperature (e.g., based on signal 134a,b) and suction temperature (e.g., based on signal 138a,b) during operation in the sensor-validation mode, thereby further improving performance of the sensor validation.

At step 410, a delay timer is started. The delay timer runs for the amount of time during which the compressor(s) 106a,b are operated according to the sensor-validation mode. As an example, the time of the delay timer may be between 1 and 5 minutes, although any other appropriate time may be used for the delay timer. In some embodiments, the delay timer runs for 3 minutes before it is complete. At step 412, the controller 160 determine whether the delay timer is complete. If the delay timer is not complete, the controller 160 continues to wait for the delay timer to complete. Otherwise, if the delay timer is complete, the controller 160 proceeds to step 414.

At step 414, current sensor measurements 166 are determined. For example, temperature, pressure, humidity, and/or the like measurements generated by one or more of the sensors 114a,b, 118a,b, 132a,b, 136a,b may be received by the controller 160 as current measurements 166. For example, the current sensor measurements 166 may correspond to one or more of the signals 116a,b, 120a,b, 134a,b, 138a,b being received from the corresponding sensors 114a, b, 118a,b, 132a,b, 136a,b. These current sensor measurements 166 may be stored in memory for comparison to the initial sensor measurements 164 (e.g., in memory 504 of controller 160 described below with respect to FIG. 5).

At step 416, the controller 160 determine whether one or more first validation criteria 168 are satisfied. The first validation criteria 168 may correspond to a requirement that a current sensor measurement value 166 is within an expected range of values or within a predetermined offset from an expected value. The first validation criteria 168 may correspond to a requirement that a difference between the current measurement value 166 and the initial measurement value 164 for a given sensor 114a,b, 118a,b, 132a,b, 136a,b is within a predefined range of difference values. The predefined range of difference values may be specific to a particular sensor 114a,b, 118a,b, 132a,b, 136a,b or sensor type being validated, specific to the HVAC system 100, and/or to the HVAC system's operating environment (e.g., whether the environment is associated with a dry climate, cold climate, etc.). As such, the predefined range of difference values may have been previously determined for the sensor(s) 114a,b, 118a,b, 132a,b, 136a,b being validated.

For instance, for sensors 114a,b positioned and configured to measure a saturated liquid temperature of condensers 108a,b (and provide corresponding SLT signals 116a,b), the predefined range of difference values may be about 5° F. to about 20° F. (e.g., or about 10° F.). For sensors 118a,b positioned and configured to measure a liquid temperature of condensers 108a,b (and provide corresponding LT signals 120a,b), the predefined range of difference values may be about 0° F. to about 20° F. (e.g., or about 5° F.). For sensors 132a,b positioned and configured to measure a saturated suction temperature of evaporators 124a,b (and provide corresponding SST signals 134a,b), the predefined range of difference values may be about 5° F. to about 20° F. (e.g., or about 10° F.). For sensors 136a,b positioned and configured to measure a suction temperature of evaporators 124a,b (and provide corresponding ST signals 138a,b), the predefined range of difference values may be about 5° F. to about 20° F. (e.g., or about 10° F.).

If the first validation criteria 168 not satisfied, an alert may be sent at step 418. For example, an alert may be transmitted to the thermostat 154 and displayed on thermostat as alert 158. The controller 160 may proceed to step 424 to update the validation history for the sensors 114a,b, 118a,b, 132a,b, 136a,b for which validation failed (e.g., to improve decision making about which sensors 114a,b, 118a, b, 132a,b, 136a,b to subsequently validate at step 404). If the first criteria 168 are satisfied, the controller 160 generally proceeds to step 420.

In some embodiments, an optional step 420 is performed where the controller 160 determines whether one or more secondary validation criteria 168 are satisfied. In some embodiments, the secondary validation criteria 168 are not associated with a comparison of an initial measurement value 164 to a current measurement value 166. For instance, the secondary validation criteria 168 may be associated with a requirement that an outdoor temperature (e.g., measured with sensor 152 of FIG. 1) is within a first predetermined temperature range and a requirement that a return air temperature (e.g., measured with sensor 150 of FIG. 1) is within a second predetermined temperature range. If the secondary criteria 168 are not satisfied at step 420, an alert may be sent at step 418. For example, an alert may be transmitted to the thermostat 154 and displayed on thermostat as alert 158. The controller 160 may proceed to step 424 to update the validation history for the sensors 114a,b, 118a,b, 132a,b, 136a,b for which validation failed (e.g., to improve decision making about which sensors 114a,b, 118a,b, 132a,b, 136a,b to subsequently validate at step 404). If the first criteria 168 are satisfied, the controller 160 generally proceeds to step 422.

In some embodiments, the controller 160 may determine whether signals 116a,b, 120a,b, 134a,b, 138a,b from each of the sensors 114a,b, 118a,b, 132a,b, 136a,b (e.g., or each of at least two of the sensors 114a,b, 118a,b, 132a,b, 136a,b being validated) did not exhibit a substantial change during operation in the validation mode. For example, the controller may determine whether the changes in signals 116a,b, 120a,b, 134a,b, 138a,b from all four of the sensors 114a,b, 118a,b, 132a,b, 136a,b being validated for a given compression circuit is greater than a threshold value. If the signals 116a,b, 120a,b, 134a,b, 138a,b did not change substantial during validation (e.g., if signals 116a,b, 120a,b, 134a,b, 138a,b changed by less than the threshold value), the controller 160 may determine that the compressor 106a,b of the circuit for which the sensors 114a,b, 118a,b, 132a,b, 136a,b are being validated is malfunctioning. An alert 158 may be provided to the thermostat 154 to indicate such a compressor malfunction.

If the first criteria 168 are satisfied at step 416 (and optionally if the secondary criteria 168 are also satisfied at step 420), the controller 160 determines that the sensors 114a,b, 118a,b, 132a,b, 136a,b are validated for the compressor circuit at step 422. The controller 160 may proceed to step 422 to update the validation history for the sensors 114a,b, 118a,b, 132a,b, 136a,b at step 424 for which validation succeeded (e.g., to improve decision making about which sensors 114a,b, 118a,b, 132a,b, 136a,b to subsequently validate at step 404).

Modifications, additions, or omissions may be made to method 400 depicted in FIG. 4. Method 400 may include more, fewer, or other steps. For example, steps may be performed in parallel or in any suitable order. While at times discussed as controller 160, HVAC system 100, or components thereof performing the steps, any suitable HVAC system or components of an HVAC system may perform one or more steps of the method.

Example Controller

Figure 5:
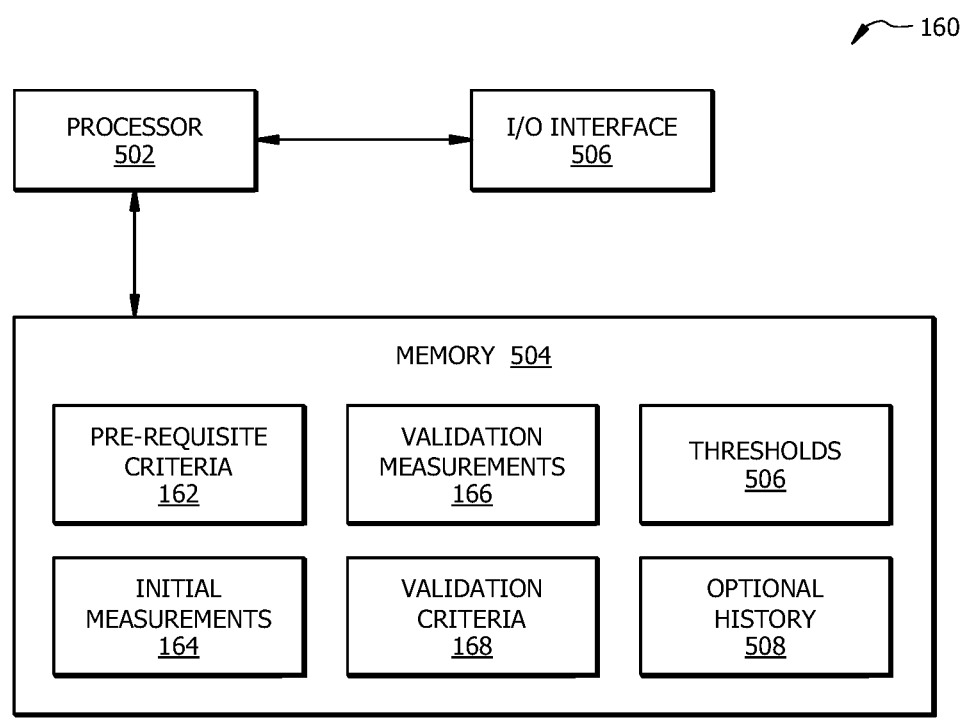
FIG. 5 is a diagram of the controller of the example HVAC system of FIG. 1.

FIG. 5 is a schematic diagram of an embodiment of the controller 160. The controller 160 includes a processor 502, a memory 504, and an input/output (I/O) interface 506.

The processor 502 includes one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 504 and controls the operation of HVAC system 100. The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory 504 and executes them by directing the coordinated operations of the ALU, registers, and other components. The processor may include other hardware and software that operates to process information, control the HVAC system 100, and perform any of the functions described herein (e.g., with respect to FIG. 4). The processor 502 is not limited to a single processing device and may encompass multiple processing devices. Similarly, the controller 160 is not limited to a single controller but may encompass multiple controllers.

The memory 504 includes one or more disks, tape drives, or solid-state drives, and may be used as an over-flow data storage device, to store programs when such programs are selected for execution, and to store instructions and data that are read during program execution. The memory 504 may be volatile or non-volatile and may include ROM, RAM, ternary content-addressable memory (TCAM), dynamic random-access memory (DRAM), and static random-access memory (SRAM). The memory 504 is operable to store the pre-requisite criteria 162, initial sensor measurements 164, current, or validation, measurements 166, validation criteria 168, thresholds 506, and operational history information 508. The pre-requisite criteria 162, initial sensor measurements 164, current measurements 166, and validation criteria 168 are described above with respect to FIGS. 1 and 4. The thresholds 506 generally include any thresholds used to perform the function described in this disclosure (e.g., a minimum or threshold time during which one or more of the compressors 106a,b should be inactive before validation is performed). The operational history information 508 generally includes information used to determine whether validation should be performed on a given sensor 114a,b, 118a,b, 132a,b, 136a,b or set of sensors 114a,b, 118a,b, 132a,b, 136a,b. For instance, the operational history information 508 may include a record of times during which one or more of the compressors 106a,b, other components of the HVAC system have been active, previous validation successes and failures for the sensors 114a,b, 118a,b, 132a,b, 136a,b, and the like.

The I/O interface 506 is configured to communicate data and signals with other devices. For example, the I/O interface 506 may be configured to communicate electrical signals with components of the HVAC system 100 including the compressors 106a,b, the expansion valves 122a,b, the blower 144, sensors 114a,b, 118a,b, 132a,b, 136a,b, 148, 150, 152, and the thermostat 154. The I/O interface 506 may provide and/or receive, for example, compressor speed signals blower speed signals, temperature signals, relative humidity signals, thermostat calls, temperature setpoints, environmental conditions, and an operating mode status for the HVAC system 100 and send electrical signals to the components of the HVAC system 100. The I/O interface 506 may include ports or terminals for establishing signal communications between the controller 160 and other devices. The I/O interface 506 may be configured to enable wired and/or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation, and air conditioning (HVAC) system comprising:
    a first compressor circuit, comprising:
        a first compressor configured to compress refrigerant flowing through the HVAC system;
        a first condenser configured to receive compressed refrigerant and allow heat to transfer from the compressed refrigerant to a first flow of air, thereby cooling the compressed refrigerant;
        a first evaporator configured to receive the cooled refrigerant and allow heat to transfer from a second flow of air to the cooled refrigerant;
        a first sensor configured to measure a value associated with the refrigerant in the first condenser or the first evaporator;
    a controller communicatively coupled to the first compressor and the first sensor, the controller configured to:
        determine, based on an operational history of the first compressor, that pre-requisite criteria are satisfied for entering a sensor validation mode, the prerequisite criteria comprising a requirement that the first compressor has been inactive for at least a minimum time;
        in response to determining the pre-requisite criteria are satisfied, determine, using the first sensor, an initial sensor measurement value;
        following determining the initial sensor measurement value, operate the first compressor according to a sensor-validation mode, wherein operating according to the sensor-validation mode comprises operating the first compressor at a maximum recommended capacity;
        following operating the first compressor according to the sensor-validation mode for at least a minimum time, determine, using the first sensor, a current sensor measurement value;
        determine whether validation criteria are satisfied for the current sensor value, based on a comparison of the current sensor measurement value to the initial sensor measurement value;
        in response to determining that the validation criteria are satisfied, determine that the first sensor is validated; and
        in response to determining that the validation criteria are not satisfied, determine that the sensor failed validation;
    and
    a second compressor circuit, comprising a second compressor, a second condenser, a second evaporator, and a second sensor configured to measure a value associated with refrigerant in the second condenser or the second evaporator;
    wherein the controller is coupled to the second compressor and the second sensor, and is further configured to:
        determine a first time since a most recent validation of the sensor of the first compressor circuit;
        determine a second time since a most recent validation of the second sensor of the second compressor circuit;
        determine the second time is greater than the first time; and
        in response to determining the second time is greater than the first time, determine that the second sensor should be evaluated for validation.

2. The HVAC system of claim 1, wherein operating according to the sensor-validation mode further comprises one or both of:
    decreasing a speed of an outdoor fan configured to provide the first flow of air across the first condenser; and
    closing dampers of an economizer of the HVAC system such that outdoor air is not included in the second flow of air across the first evaporator.

3. The HVAC system of claim 1, the controller further configured to, prior to determining the initial sensor measurement value, determine that one or more secondary pre-requisite criteria are satisfied, the secondary pre-requisite criteria comprising a requirement that cooling is needed in a space being conditioned by the HVAC system, a requirement that a current time is within a predefined sensor validation time interval, and a requirement that the first compressor is due for validation.

4. The HVAC system of claim 1, wherein:
    the first evaporator of the first compressor circuit is an intertwined evaporator, wherein the first sensor is located in or on the intertwined evaporator; and
    the controller is further configured to, prior to determining the initial sensor measurement value, determine that all compressors of the HVAC system have been inactive for at least the minimum time.

5. The HVAC system of claim 1, the controller further configured to determine whether the validation criteria are satisfied for the current sensor value by:
    determining a difference between the current measurement value and the initial measurement value;
    determining whether the difference is within a predefined range of difference values, wherein the predefined range corresponds to a range of values previously determined for the first sensor being validated;
    responsive to determining the difference is within the predefined range, determining that the validation criteria are satisfied; and
    responsive to determining the difference is not within the predefined range, determining that the validation criteria are not satisfied.

6. The HVAC system of claim 1, wherein the controller is further configured to:
- determine that one or more secondary sensor validation criteria are satisfied, the secondary sensor validation criteria comprising one or both of a requirement that an outdoor temperature is within a first predetermined temperature range and a requirement that a return air temperature is within a second predetermined temperature range; and
- in response to determining that at least one secondary sensor validation criteria is not satisfied, determine that the sensor failed validation.

7. A method of operating a heating, ventilation, and air conditioning (HVAC) system, the method comprising:
- determining, based on an operational history of a compressor of the HVAC system, that pre-requisite criteria are satisfied for entering a sensor validation mode, the prerequisite criteria comprising a requirement that the compressor has been inactive for at least a minimum time;
- in response to determining the pre-requisite criteria are satisfied, determining an initial sensor measurement value, based on a signal from a first sensor of a first compressor circuit of the HVAC system;
- following determining the initial sensor measurement value, operating the compressor according to a sensor-validation mode, wherein operating according to the sensor-validation mode comprises operating the compressor at a maximum recommended capacity;
- following operating the compressor according to the sensor-validation mode for at least a minimum time, determining a current sensor measurement value;
- determining whether validation criteria are satisfied for the current sensor value, based on a comparison of the current sensor measurement value to the initial sensor measurement value;
- in response to determining that the validation criteria are satisfied, determining that the first sensor is validated;
- in response to determining that the validation criteria are not satisfied, determining that the sensor failed validation;
- determining a first time since a most recent validation of the first sensor of the first compressor circuit of the HVAC system;
- determining a second time since a most recent validation of a second sensor of a second compressor circuit of the HVAC system;
- determining that the second time is greater than the first time; and
- in response to determining the second time is greater than the time, determining that the second sensor should be evaluated for validation.

8. The method of claim 7, wherein operating according to the sensor-validation mode further comprises one or both of:
- decreasing a speed of an outdoor fan configured to provide the first flow of air across the condenser; and
- closing dampers of an economizer of the HVAC system such that outdoor air is not included in the second flow of air across the evaporator.

9. The method of claim 7, further comprising, prior to determining the initial sensor measurement value, determining that one or more secondary pre-requisite criteria are satisfied, the secondary pre-requisite criteria comprising a requirement that cooling is needed in a space being conditioned by the HVAC system, a requirement that a current time is within a predefined sensor validation time interval, and a requirement that the compressor is due for validation.

10. The method of claim 7, wherein the first sensor is located in or on an intertwined evaporator; and
- the method further comprising prior to determining the initial sensor measurement value, determining that all compressors of the HVAC system have been inactive for at least the minimum time.

11. The method of claim 7, further comprising determining whether the validation criteria are satisfied for the current sensor value by:
- determining a difference between the current measurement value and the initial measurement value;
- determining whether the difference is within a predefined range of difference values, wherein the predefined range corresponds to range of values previously determined for the first sensor being validated;
- responsive to determining the difference is within the predefined range, determining that the validation criteria are satisfied; and
- responsive to determining the difference is not within the predefined range, determining that the validation criteria are not satisfied.

12. The method of claim 7, further comprising:
- determining that one or more secondary sensor validation criteria are satisfied, the secondary sensor validation criteria comprising one or both of a requirement that an outdoor temperature is within a first predetermined temperature range and a requirement that a return air temperature is within a second predetermined temperature range; and
- in response to determining that at least one secondary sensor validation criteria is not satisfied, determining that the sensor failed validation.

13. A controller of a heating, ventilation, and air conditioning (HVAC) system, the controller comprising a processor configured to:
- determine, based on an operational history a compressor of the HVAC system, that pre-requisite criteria are satisfied for entering a sensor validation mode, the prerequisite criteria comprising a requirement that the compressor has been inactive for at least a minimum time;
- in response to determining the pre-requisite criteria are satisfied, determine, using a first sensor of a first compressor circuit of the HVAC system, an initial sensor measurement value;
- following determining the initial sensor measurement value, operate the compressor according to a sensor-validation mode, wherein operating according to the sensor-validation mode comprises operating under cooling conditions;
- following operating the compressor according to the sensor-validation mode for at least a minimum time, determine, using the first sensor, a current sensor measurement value;
- determine whether validation criteria are satisfied for the current sensor value, based on a comparison of the current sensor measurement value to the initial sensor measurement value;
- in response to determining that the validation criteria are satisfied, determine that the first sensor is validated;
- in response to determining that the validation criteria are not satisfied, determine that the first sensor failed validation;
- determine a first time since a most recent validation of the first sensor of the first compressor circuit;
- determine a second time since a most recent validation of a second sensor of a second compressor circuit;

determine the second time is greater than the first time; and in response to determining the second time is greater than the first time, determine that the second sensor should be evaluated for validation.

14. The controller of claim 13, further configured to, prior to determining the initial sensor measurement value, determine that one or more secondary pre-requisite criteria are satisfied, the secondary pre-requisite criteria comprising a requirement that cooling is needed in a space being conditioned by the HVAC system, a requirement that a current time is within a predefined sensor validation time interval, and a requirement that the compressor is due for validation.

\* \* \* \* \*